Feb. 21, 1928.
B. L. BAKER
1,660,027
RETARDING DEVICE
Filed Jan. 11, 1926 2 Sheets-Sheet 2
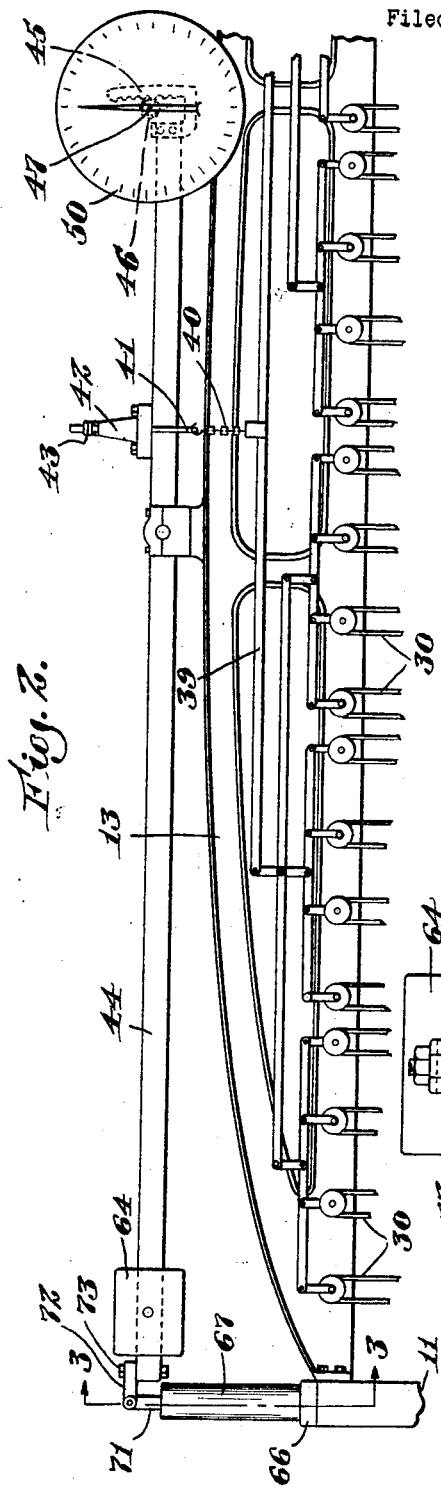
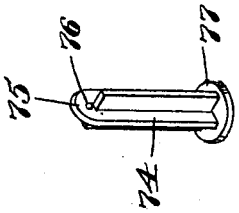
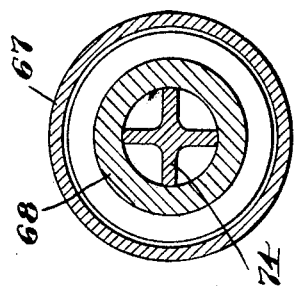
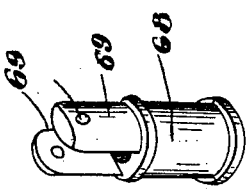
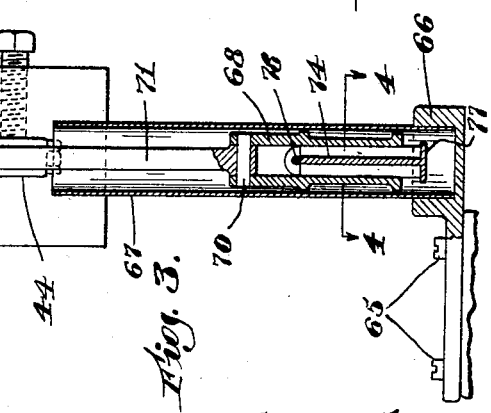
Inventor
Burton L. Baker
by James R. Hodder
Attorney Patented Feb. 21, 1928.

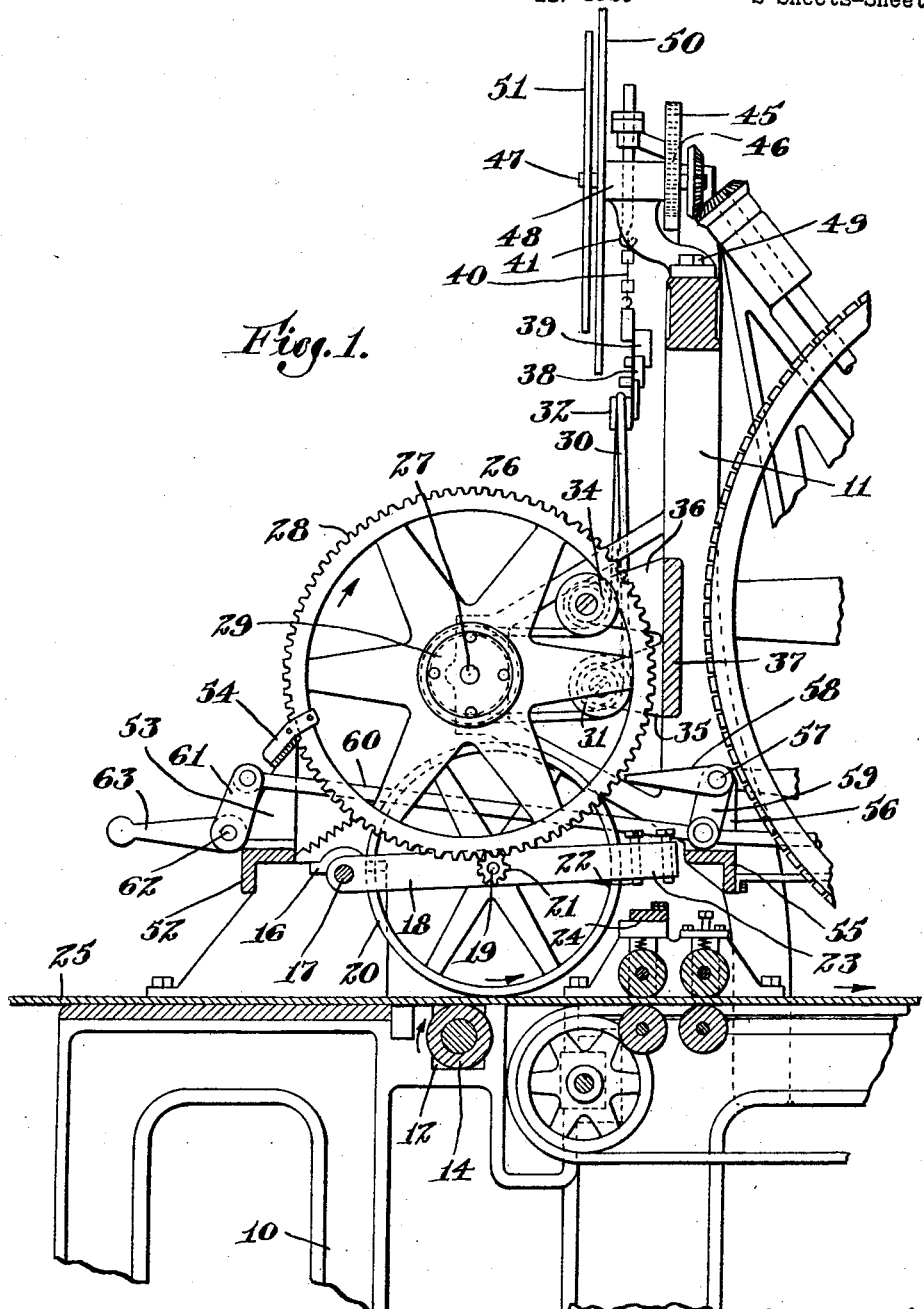

1,660,027

UNITED STATES PATENT OFFICE.

BURTON L. BAKER, OF BROOKLINE, MASSACHUSETTS, ASSIGNOR TO HARDING ENGINEERING COMPANY, OF EAST BOSTON, MASSACHUSETTS, A CORPORATION OF MASSACHUSETTS.

RETARDING DEVICE.

Application filed January 11, 1926. Serial No. 80,598.

My present invention relates to measuring machines, and more particularly to an improved shock-absorbing or dead-beat device for such machines.

In measuring machines employed, for example, in the leather industries for measuring the area, maximum, minimum or average thickness of hides or skins, an indicating hand operated by a pivoted lever connected to the measuring instrumentalities is subject to violent fluctuations, not so much during the actual measuring operation but after the hide has been measured and the indicating hand is returned to zero or initial position. The indicating hand is ordinarily operated by means of a circular rack secured to or formed on the end of a pivoted lever, and in order to bring the indicating hand back to normal, such pivoted lever is provided with a weight adjustably mounted thereon, the weight causing the pivoted lever to swing back to normal position after the hide or skin has passed through the machine. After the indicating hand has moved to its maximum or measuring position and then released because of the hide passing through the machine, the weight on the lever causes a return of such lever to normal position and therefore a springing back of the indicating hand to zero position. Because of the weight of the various parts and the necessary unbalance existing therebetween, the weight on the lever will cause such lever to swing considerably past the zero point, after which it will swing upward again; that is, there is a pronounced oscillation of the pivoted lever and, therefore, of the indicating hand before the indicating hand comes to rest in the zero position. It is, therefore, impossible to send hides through the machine rapidly as the operator must wait before starting a hide until the indicating hand comes to rest. Also, this oscillating movement on the part of the lever tends to throw the indicating hand and the measuring instrumentalities out of adjustment.

My present invention is designed to overcome the objectional features above enumerated and in carrying out my invention, I associate with the weighted end of the pivoted lever a shock-absorbing or dead-beat device comprised essentially of a movable piston carrying a valve, which piston and valve are movable to and fro in a cylinder loaded with liquid. The construction is such that a rapid movement of the piston in one direction is permitted while only a slow movement in the other direction up to a certain point in its travel is permitted. The device is arranged so that there is no no over-run of the indicating hand associated with the pivoted lever and therefore such indicating hand will be brought to rest in precisely the same manner as a dead-beat indicating instrument.

The object of my invention, therefore, is an improved shock-absorbing or dead-beat attachment for measuring machines.

In the accompanying drawings illustrating the preferred embodiment of my invention, Fig. 1 is a sectional side elevation of a portion of the machine to which the invention has been applied;

Fig. 2 is a front elevation of a portion of the upper end of Fig. 1;

Fig. 3 is a sectional elevation on the line 3—3 of Fig. 2;

Fig. 4 is a sectional plan view on the line 4—4 of Fig. 3;

Fig. 5 is a perspective view of the piston, and

Fig. 6 is a perspective view of the valve associated with the piston illustrated in Fig. 5.

The measuring machine to which my invention has been applied may be of the usual and well known type and therefore only so much of such machine is shown as is necessary for an understanding of my invention.

In the accompanying drawings, therefore, 10 designates the bed or standard of a leather measuring machine, to the upper surface of which is secured a framework 11. The upper face or table portion of the base 10 is cut away at 12 and to the side members of the base 10 are formed bearings, in which is rotatably mounted a shaft 13. Secured to the shaft 13 is a bed roll 14, a plane passing thru the upper surface of this roll lying slightly above the upper surface of the base 10, and means is provided for rotating the roll 14 in the direction of the arrow shown in Fig. 1. Above the base 10 and on each side of the members thereof are formed bearing clamps 16 and lying in such bearing clamps and extending transversely of the machine above the top of the base 10 is a shaft 17. Referring to Fig. 1, it will be noted that on the shaft 17 is rotatably mounted a bar 18 and this bar forms a side plate of a frame which has, intermediate its ends, rotatably mounted a shaft 19. Secured to the shaft 19 so as to be rotatable therewith is a measuring wheel 20 and also a pinion 21. The weight of the frame 18 is sufficient to cause a downward movement of the measuring wheel 20 which, therefore, would come into engagement with the bed roll 14, were it not prevented by some means. This means is an adjusting screw 22 which passes through the enlargement 23 on the rear end of the frame 18 and the lower end of this adjusting screw engages with the cross bar 24 extending between the side members of the framework 11 and thus limits the downward movement of the measuring wheel 20. This adjustment of the measuring wheel is such that the measuring wheel 20 will never come into direct engagement with the bed roll 14, but will be driven by such bed roll through the medium of a skin or hide 25 as the same is passed between the bed roll 14 and the measuring wheel 20. While in Fig. 1 but a single frame 18 and single measuring wheel 20 are shown, it is to be understood that there are a plurality of measuring wheels 20 arranged parallelly with each other.

On the side members of the framework 11 and extending forwardly thereof, are sub-frame members 26, in which is secured a shaft 27 which lies parallel with the shaft 17 and the various shafts 19 of the plurality of measuring wheels 20 and on this shaft 27 are rotatably mounted a plurality of indicating gear wheels 28 which are adapted to mesh with their respective pinions 21 of the measuring wheels 20 when the frames 18 are in their uppermost position because of the interposition of a sheet of leather 25 between the measuring wheels 20 and bed roll 14. Each of the indicating gear wheels 28 is provided with a hub 29 and considering two adjacent indicating gear wheels 28, the hub of one of such gear wheels has secured thereto one end of a rope or chain 30 which passes under a rotatably mounted pulley 31 over a pulley 32 on a beam 33, thence downwardly and under a rotatably mounted pulley 34, and thence to the pulley 29 on the adjacent indicating gear wheel 28. The pulleys 31 and 34 are rotatably mounted in forwardly extending bearing blocks 35 and 36 respectively, each of these bearing blocks being formed integral with a web 37 that extends between, and is formed integral with, the uprights of the frame member 11. There are a plurality of these forwardly extending bearing blocks 35 and 36 arranged parallel to each other and located one of each of these blocks between adjacent indicating gear wheels 28. The structure above described is the usual measuring machine and in such measuring machine there are of course a plurality of pulleys 32 arranged on the beam 33, which beam is in turn pivotally mounted to a second beam 38 and it is to be understood that there are a plurality of such beams 38, though less in number than the beams 33. The beam 38 is in turn pivotally mounted to a beam 39, of which there is but one in the machine. At the middle point of the beam 39 is pivotally attached the lower end of a chain, rope or other instrumentality 40, to the upper end of which is secured a threaded member 41 and which threaded member passes through a hole in one end of a member 42 and screwing onto the member 41 is a thumb nut 43 and by means of which the relative position of the member 41 with respect to the member 42 may be adjusted. The end of the member 42 remote from the adjusting screw 41 is secured to a pivoted beam 44, on one end of which is formed a segmental gear 45. This segmental gear 45 meshes with and drives a pinion 46 secured to a shaft 47 that is rotatably mounted in a bearing member 48 secured to the top of the frame member 11 by bolts 49. To the front end of the bearing member 49 is secured, against movement, a dial plate 50 and the shaft 47 protrudes through such dial plate. Secured to the upper end of the shaft 47 is an indicating hand or pointer 51 which co-operates with graduations marked on the face of the dial plate 50. Secured to the lower front ends of the side members of the frame 11 and extending transversely between such side members is an angle plate 52 and to the top of this angle plate is secured a stop block 53, the upper edge of which is bevelled, as shown, to engage with stops 54 attached to the indicating gear wheels 28 at such a point that the indicating hand 51 registers with the zero indication on the graduated dial plate 50 and this represents the normal or initial position of the device. Secured to the frame member 11 between the side uprights thereof is an angle member 55, on the top surface of which is formed or secured in any desired manner and at each end thereof a bearing block 56. Rotatably mounted in the bearing block 56 is a shaft 57 and secured to such shaft 57 are a plurality of locking pawls 58, there being one locking pawl for each of the indicating gear wheels 28. Secured to the shaft 57, intermediate the ends thereof, and preferably substantially midway between the uprights of the frame member 11 or with respect to the plurality of parallelly arranged indicating gear wheels 28, is a crank arm 59 to the lower end of which is pivotally attached the rear end of a connecting rod 60. The connecting rod 60 is pivotally attached at its front end to a link 61. This link 61 is secured to a shaft 62 that is rotatably mounted in a bearing secured to the top surface of the angular member 52 and also secured to the shaft 62 is an operating arm or handle 63. From the above description it will be obvious that if the indicating gear wheels 28 are rotated in the direction of the arrow shown, rotation in a contrary direction will be prevented by the engagement of the locking pawl 58 with the gear teeth so that after the indicating gear wheels 28 have been moved to a point determined by the rotation of the respective measuring wheels 20, they will remain locked in position and the movement imparted to the indicating hand 51 by such rotative movement of the gear wheels 28 will be indicated on the graduations on the dial plate 50. The operator in throwing the device back to its zero position, will lift up on the operating handle 63, throwing the crank arm 59 in such a manner as to depress the engaging portion of the locking pawl 58 to thereby release the indicating wheels 28 and the beam 44 is provided with an adjustable counterweight 64 which causes a rotary movement of the shaft 47 through the segmental gear 45 and pinion 46. This return rotary movement will continue until the stops 54 have engaged with the beveled surface of the block 53. As above stated, however, the indicating hand 51 will overrun the zero position and will then oscillate back and forth past such zero position until finally coming to rest.

Secured to one end of the frame 13 adjacent to the free end of the lever 44 by screws 55 is a base 66, counterbored to receive an open cylinder 67. This cylinder is filled with any suitable liquid as water, alcohol, glycerine, ordinary machine oil, and slidably mounted in such cylinder is a piston 68, the extreme outer diameter of such piston being less than the internal diameter of the cylinder 67 and the difference between such diameters will depend on the rate of travel it is desired to permit to the lever 44 and also with regard to the character of the material with which the cylinder is filled. Formed integral with the piston 68 and extending forwardly therefrom are spaced ears or lugs 68 and pivotally attached to the upper end and between these lugs is a wrist pin 70. Pivotally mounted on the wrist pin 70 is the lower end of a piston rod 71, the upper end of which is pivotally attached to the outer end of a link 72. This link 72 is secured to the free end of the lever 44 by means of a bolt 73. The piston 68 is made hollow or tubular in form to receive on the interior thereof as a sliding fit a valve 74. The valve 74 has the body portion thereof webbed, as shown, and one of these webs is extending upwardly, as indicated at 75. This portion 75 is perforated at 76 to receive the cotter pin 78 and which will prevent the valve 74 from dropping downward out of the piston 68. To the lower end of the valve 74 is attached or formed a substantially circular plate 77 which engages with the bottom face of the piston 68 and forms the valve and valve seat of the device.

When the indicating hand 50 is in the zero position, the piston 68 will be assumed to be at its lowermost point with regard to the cylinder 67, also the valve 74 will be in its lowermost position with the portion 77 thereof removed from the lower surface of the piston 68. It will be obvious, therefore, that if the piston rod 71 is drawn upward by the lever 44 that the piston and valve, 68 and 74 respectively, will offer too little response to the passage of the fluid contained within the cylinder 67 from above the piston 68 to a point below such piston. This is because of the fact that the external diameter of the piston 68 is less than the internal diameter of the cylinder 67 and the diameters are proportioned to the character of the material within the cylinder and also because the valve 74 is open and offers, therefore, no response to the flow of liquid therethrough. The piston 68 and attached parts will, therefore, not affect either the rate or travel or the accuracy of movement of the lever 44 and, therefore, will not affect the accuracy of the indicating hand 51. Assume now that the indicating hand 51 has reached its uppermost position, that the indication on the dial as to the measurement of the hide or skin 25 has been noted and that the operator moves the handle 63 to release the locking pawls 58 from the teeth of the gear wheels 28. The gear wheels 28 will rotate in an anti-clockwise direction until the stops 54 thereon come into engagement with the bevelled edge of the stop bar 53 and the lever 44 will rotate about its axis in an anti-clockwise direction because of the unbalance existing in such lever and also because of the adjustable weight 64 and the indicating hand 51 will start toward the zero position. The free end of the lever 44 moving downwardly will cause a downward movement of the piston rod 71 and the piston 68 but because of the pressure on the liquid below, such piston 68 and valve 74 will move upward until the circular portion 77 thereof engages with the lower face of the piston 68. The downward movement of the outer end of the lever 74 will, therefore, be slowed down to the point controlled by the ability of the fluid below the piston to leak upward between the piston and cylinder. This speed is such that when the indicating hand 51 reaches the zero position, the piston 68 will also have reached its zero or lowermost position and the lever 44 is brought to a stop. No further upward pressure existing on the piston 68, the valve 74 will move downward under its own weight into the position shown in Fig. 3.

It will be obvious from the above description that my device being attached to lever 44 of the measuring machine, that such lever has a free upward movement of its outer end to cause a further and accurate movement of the indicating hand 51 and that when conditions are reversed, that downward movement of the free end of the lever 44 will take place easily and gradually and such lever will be brought to rest in its zero or initial position without shock or over-run.

While I have necessarily shown and described the preferred embodiment of my invention somewhat in detail, it is to be understood that I may vary the size, shape and arrangement of parts comprising the device within wide limits without departing from the spirit of the invention.

Having thus described my invention, what I claim as new is:

A device for attachment to measuring machines and the like, comprising a cylinder, a fluid within said cylinder, a hollow piston slidably mounted within the cylinder and arranged to permit passage of the fluid in the cylinder from one side to the other thereof, a slidably mounted valve housed within and in alinement with the longitudinal axis of said piston, means for pivotally attaching said piston to the measuring device, said means secured to said piston at the end remote from the valve, said valve being so constructed and arranged and attached to the piston as to be normally open, whereby rapid movement of the piston is permitted in one direction and to close when the piston is moved in the opposite direction whereby rapid movement of the piston is prevented.

In testimony whereof, I have signed my name to this specification.

BURTON L. BAKER.